Patented July 13, 1954

2,683,680

UNITED STATES PATENT OFFICE 2,683,680

METHOD OF RECOVERING VITAMIN $B_{12}$ ACTIVITY

Jerry Robert D. McCormick, New City, N. Y., and Siegfried A. Muller, Westwood, N. J., assignors to American Cyanamid Company, New York, N. Y., a corporation of Maine No Drawing. Application November 7, 1951,
Serial No. 255,321

8 Claims. (Cl. 167—81)

This invention relates to the recovery and purification of vitamin material and, more particularly, to recovery and purification of materials having vitamin B12 activity.

It has been known for several years that liver contained a substance or substances which were of great value in the treatment of certain deficiency diseases and, in particular, pernicious anemia. More recently, such a substance was isolated from liver concentrates and given the name vitamin B12. Following the isolation of vitamin B12, several other compounds, for instance B12b, have been isolated which are quite similar to vitamin B12 in biological activity and in chemical construction. In fact, all of these materials are so similar in physical and chemical properties that a process suitable for the purification and recovery of one is suitable for the purification and recovery of all. Therefore, in this specification and claims, no distinction will be made between the various members of the vitamin B12 family and all will be referred to collectively as materials having vitamin B12 activity.

Subsequent to the isolation from liver extracts of materials having vitamin B12 activity, it has been found that many other sources of such materials are available. For instance, materials having vitamin B12 activity may be isolated from fermentation liquors which have supported the growth of various microorganisms, such as may be illustrated by the following: *Streptomyces olivaceus, Streptomyces aureofaciens, Streptomyces griseus, Streptomyces rhimosus, Eremothecium asbbyii, Flavobacterium solare* and many others. Unfortunately, no source of vitamin B12 material has yet been discovered in which the materials are present in other than small quantities. Therefore, the problem of recovering these materials from natural sources is extremely involved and difficult. One method which has been employed to some extent in the recovery and purification of vitamin B12 materials comprises extracting a source of such materials with an organic liquid which is a good solvent for the vitamin B12 material, but which is a poor solvent for the impurities usually associated with such material. This method has met only a limited degree of success due to the lack of a known solvent which had a sufficiently high specific solubility or specificity for the vitamin B12 material. The new process of this invention is concerned with extraction procedures in which new solvents having such a high specificity for vitamin B12 material are employed.

According to the new method of this invention, a source of vitamin B12 material is extracted with an organic solvent comprising a half acid ester of a dicarboxylic acid and the vitamin B12 is then recovered from the organic solvent. Suitable half esters are those which may be considered to be esters of dicarboxylic acids having not more than about 8 carbon atoms with alcohols having not more than about 6 carbon atoms.

Acid esters of the following types of dicarboxylic acids are of value: monocyclic aromatic dicarboxylic acids, for instance phthalic and tetrachlorophthalic acid; aliphatic dicarboxylic acids, for instance oxalic acid and succinic acid; oxy acids, for instance diglycollic acid. The following specific half esters are given by way of illustration: mono-n-hexyl oxalate, mono-n-butyl malonate, mono-isobutyl succinate, mono-n-propyl glutarate, mono-methylisobutylcarbinyl maleate, mono-ethyl adipate and mono-n-butyl phthalate. Of course, when selecting a solvent, one should be selected which is a liquid at a temperature less than about 100° C. or which becomes a liquid in the presence of water at a temperature of less than 100° C. if an aqueous solution is to be extracted. Other factors which should be considered in choosing a solvent include the specific selectivity of the individual half ester and its availability or relative ease of preparation.

A process of purifying vitamin B12 material and employing the new solvents of this invention has many advantages over a process employing prior art solvents for vitamin B12. For instance, the new half ester solvents of this invention have relatively high specificities for vitamin B12 material. By high specificity is meant that the half esters are excellent solvents for B12 material, but only poor solvents for impurities usually associated with vitamin B12 materials. This advantage enables one, by the process of this invention, to obtain better recoveries and a greater degree of purification. The new half ester solvents of this invention are also advantageous in that they have a high distribution coefficient with respect to water for vitamin B12 material. By high distribution coefficient with respect to water it is meant that when a solution of vitamin B12 material in a half ester solvent is in equilibrium with an aqueous solvent, the concentration of B12 material in the organic phase will be found to be several times higher than the concentration of the vitamin B12 material in the aqueous phase. This quality of the half ester solvents enables one to obtain exceptionally high recoveries by liquid-liquid extraction of an aqueous solution of vitamin B12 material and since the impurities usually associated with vitamin B12 material are relatively water-soluble, a very high degree of purification is obtained. A further advantage of the half ester solvents of this invention is that they have none of the objectionable properties of many of the prior art solvents for vitamin B12 materials such as the phenols. This enables one to employ the half ester solvents in the simplest of apparatus without expensive protection against corrosion. It also enables workmen to operate without danger of personal injury. As will be obvious to those skilled in the art, the above advantages make for a simple and efficient process of vitamin B12 purification.

Practically any source of vitamin B12 material may be employed in the new process of this invention. For instance, an unmodified fermentation liquor which has supported the growth of microorganisms, as previously outlined, may be extracted by liquid-liquid extraction, or if the liquor from such a fermentation contains antibiotics, these may be removed prior to the extraction. Likewise, the microorganisms, for instance bacteria or fungi, may or may not be removed before extraction. A concentrated aqueous solution of B12 material may be prepared and this treated according to the process of this invention by liquid-liquid extraction, or a solid concentrate may be treated according to the process of this invention by solid-liquid extraction. In other words, the new process of this invention may be employed to separate vitamin B12 material from practically any mixture containing the same which is usually encountered in vitamin B12 purification. The source of vitamin material should preferably contain at least 0.1 gamma of vitamin B12 activity per gram of total solids, if solid-liquid extraction is contemplated, and at least 0.01 gamma of vitamin B12 activity per ml. of solution, if liquid-liquid extraction is contemplated. While a practically saturated solution of B12 material may be extracted by a liquid-liquid extraction if desired, a greater degree of purification will generally be obtained if the concentration of vitamin material is below about 50.0 gammas of vitamin B12 activity per ml.

The amount of half ester solvent employed may be varied widely. In solid-liquid extraction, sufficient solvent should be employed to dissolve substantially all the vitamin B12 material and, in fact, it is usually advantageous to employ a considerable excess since vitamin B12 material is so soluble in the half ester solvents, that the use of a bare minimum results in a considerable loss by absorption in the insoluble material. As a general rule, in solid-liquid extraction, a weight of solvent equal to 1 to 100 times the weight of the solid material to be extracted will be found to be most advantageous depending upon the percentage of vitamin B12 contained in the solid matter, the solubility of the vitamin B12 in the particular half ester solvent and the degree of recovery desired. As a general rule in liquid-liquid extraction, a volume of solvent equal to about 0.01 to 100 times the volume of aqueous solution, depending upon the distribution coefficient of the particular half ester selected and the water solubility of the half ester, will be found to be most advantageous. Of course, if the half ester is somewhat water soluble, the solvent should be used in a quantity greater than the solubility, so that the two phases are actually obtained. Of course, in most instances, it is possible to decrease the water solubility of the organic half ester by employing it in combination with other solvents such as butanol and chloroform, or by employing a salt to decrease the water solubility of the half ester.

It is one of the advantages of the new process of this invention that a liquid-liquid extraction of an aqueous solution may be carried out within a wide range of hydrogen-ion concentrations. Since however, the half esters are naturally acidic solvents, they should not be employed in basic solution, as this will partially neutralize the half ester solvent and thus destroy its effectiveness. As a general rule in liquid-liquid extraction, a hydrogen ion concentration in the aqueous phase below about pH 5 will be found to be advantageous. The hydrogen ion concentration should not be below about pH 1.0 as a highly acidic solution tends to destroy the vitamin B12 activity. As a general rule, hydrogen ion concentrations of about pH 2.0 to 5.0 will be found to be the most advantageous.

Another advantage of the new process of this invention is that it may be carried out within a very wide range of temperatures. For instance, temperatures from 0° C. to 80° C. or even 100° C. may be employed. For reasons of convenience, room temperature, i. e., 20° C. to 40° C. is usually the preferred range. Of course, some of the half esters suitable for the process of this invention are solids at room temperature and with these solvents, a temperature should be employed at which they are liquid or at which they become liquid in the presence of water.

Practically any of the usual extracting procedures may be employed in the new process of this invention. For instance, in solid-liquid extraction, a dispersion of the vitamin B12 source may simply be formed in the half ester solvent, the insoluble matter removed, and the B12 activity recovered from the half ester solution. In liquid-liquid extraction, any procedure is satisfactory which obtains interfacial contact between the aqueous solution of vitamin B12 activity and the half ester solvent. As a general rule, counter-current extraction is preferred since this procedure obtains the greatest degree of interfacial contact; however, in small scale operation, a batch procedure may be preferable due to the convenience of operation.

After the source of vitamin B12 material has been extracted, with the half ester solvent, the organic phase is separated and thereafter treated to recover the vitamin B12 activity. The vitamin material may be recovered by any of several procedures. The preferred procedure comprises treating the organic solution of vitamin material with about 5 to 20 volumes of a liquid which is soluble in the half ester, but which has practically no solvent power for the vitamin B12 material. Examples of suitable liquids for this purpose may be illustrated by the following: benzene, ether, chloroform, higher petroleum ethers, acetone, or other organic liquids of this type. Such a dilution reduces the solubility of the vitamin B12 material and a precipitate of the same is obtained. This precipitate can be removed by the usual procedures, such as filtration, decantation, centrifugation, or the solvent-nonsolvent mixture may be extracted with an aqueous solvent to recover the vitamin material. Of course, in some instances, a combination of such procedures, such as filtration and aqueous extraction may be employed.

The invention will be more particularly illustrated by the following examples.

*Example I*

1 part by volume of an aqueous solution containing about 20 gammas of vitamin B12 activity per ml. was shaken with 2 parts by volume of 30% sodium chloride solution and 2 parts by volume of monomethyl adipate. The organic phase was separated and found to contain 7 gammas of B12 activity per ml. while the aqueous phase assayed 0.1 gamma per ml. This solution was diluted with about 15 parts by volume of benzene and the resulting mixture was then extracted with about 5 parts by volume of water to effect recovery of the B12 activity. The procedure of this example results in a several-fold purification of the vitamin B12 material.

*Example II*

The procedure of Example I was repeated except that monopropyl malonate was employed in place of monomethyl adipate. The recovery of purified vitamin B12 activity was substantially the same.

*Example III*

The procedure of Example I was repeated except the monoethyl ester of diglycollic acid was employed in place of the monomethyl adipate of Example I. A substantially equal yield of purified B12 activity was obtained.

*Example IV*

2 parts by volume of an aqueous solution containing about 20 gammas of B12 per ml. was shaken with 2 parts by volume of monoethyl phthalate. The organic phase was separated and found to contain 26 gammas of B12 activity per ml. while the aqueous phase assayed only 0.2 gamma per ml. Upon recovery of the B12 activity from the half acid ester solvent it was found to be much purer than the starting material.

*Example V*

100 parts by volume of a concentrate of aureomycin mash containing 900 gammas of B12 activity per liter which had been filtered at pH 8.5 was warmed to 50° C. and then stirred for 5 minutes with 10 parts by weight of melted monobutyl phthalate. The half acid ester was separated by chilling the extraction mixture and thereafter treated to recover the B12 activity in a greatly purified state.

*Example VI*

The procedure of Example V was repeated except that monobutyl tetrachlorophthalate was employed in place of the monobutyl phthalate of that example. The yield of purified B12 material was substantially the same.

*Example VII*

Two parts by volume of a pink aqueous solution of crude vitamin B12 material was shaken with 4 parts of 30% sodium chloride solution and then with 4 parts by volume of monomethylisobutylcarbinyl maleate. Most of the pink color (vitamin B12 activity) was thus transferred to the organic phase. The organic phase was separated and diluted with 25 parts by volume of benzene and then extracted with about 10 parts by volume of water. Most of the pink color was thereby transferred to the aqueous phase. The resulting aqueous solution was found to be several times purer than the starting material.

We claim:

1. A method of recovering vitamin B12 activity from materials containing the same, which comprises extracting a material containing vitamin B12 activity with a liquid organic half acid ester of a dicarboxylic acid having not more than 8 carbon atoms and a lower alkyl alcohol having not more than 6 carbon atoms and, thereafter, recovering the vitamin B12 activity from said half ester solvent by treating it with an organic liquid soluble therein having substantially no solvent power for vitamin B12.

2. A method of recovering vitamin B12 from Streptomyces fermentation liquors which comprises the steps of contacting said fermentation liquor with a liquid organic half acid ester of a dicarboxylic acid having not more than 8 carbon atoms and a lower alkyl alcohol having not more than 6 carbon atoms and after the vitamin B12 has been extracted from the aqueous liquor by the half ester solvent recovering the vitamin B12 from said half ester solvent by treating it with a liquid soluble therein having no substantial solvent power for vitamin B12.

3. A method of recovering vitamin B12 from aqueous solutions containing the same, which comprises the steps of extracting said aqueous solutions at a hydrogen ion concentration within the range pH 2 to pH 5 with a liquid organic half acid ester of a dicarboxylic acid having not more than 8 carbon atoms and a lower alkyl alcohol having not more than 6 carbon atoms and after the vitamin B12 has been extracted from the aqueous liquor by the half ester solvent recovering the vitamin B12 from said half ester solvent by treating it with a liquid soluble therein having no substantial solvent power for vitamin B12.

4. The method of claim 1 wherein said half acid ester is monoethyl phthalate.

5. The method of claim 1 wherein said half acid ester is monomethyl adipate.

6. The method of claim 1 wherein said half ester is monobutyl tetrachlorophthalate.

7. The method of claim 1 wherein said half acid ester is the monoethyl ester of diglycollic acid.

8. The method of claim 1 wherein said half acid ester is monomethylisobutylcarbinyl maleate.

References Cited in the file of this patent

UNITED STATES PATENTS

| Number | Name | Date |
|---|---|---|
| 2,530,416 | Wolf | Nov. 21, 1950 |
| 2,563,794 | Rickes | Aug. 7, 1951 |

OTHER REFERENCES

Fantes: Proceedings of the Royal Society (1950), pages 592 to 598.